(12) United States Patent
Brons et al.

(10) Patent No.: US 9,269,380 B1
(45) Date of Patent: Feb. 23, 2016

(54) DEVICES INCLUDING A NEAR FIELD TRANSDUCER (NFT), AT LEAST ONE CLADDING LAYER AND INTERLAYER THERE BETWEEN

(71) Applicant: SEAGATE TECHNOLOGY LLC, Cupertino, CA (US)

(72) Inventors: Justin Glen Brons, Bloomington, MN (US); Tong Zhao, Eden Prairie, MN (US); Xiaoyue Huang, Eden Prairie, MN (US); Michael C. Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/796,464

(22) Filed: Jul. 10, 2015

(51) Int. Cl.
*G11B 5/31* (2006.01)
*G11B 5/00* (2006.01)

(52) U.S. Cl.
CPC ........ *G11B 5/314* (2013.01); *G11B 2005/0021* (2013.01)

(58) Field of Classification Search
CPC ........ G11B 5/314; G11B 5/6088; G11B 5/84; G11B 5/1272; G11B 5/187; G11B 5/31; G11B 5/6082; G11B 5/3116; G11B 5/3136; G11B 5/4866
USPC .................................. 360/125.31; 369/13.01
See application file for complete search history.

(56) References Cited

U.S. PATENT DOCUMENTS

| | | | |
|---|---|---|---|
| 6,144,098 A | 11/2000 | Iyer | |
| 8,040,761 B2 | 10/2011 | Kawamori | |
| 8,343,364 B1 | 1/2013 | Gao | |
| 8,385,158 B1 | 2/2013 | Hu | |
| 8,400,902 B2 | 3/2013 | Huang | |
| 8,427,925 B2 | 4/2013 | Zhao | |
| 8,599,656 B2 | 12/2013 | Jin | |
| 8,619,512 B1 * | 12/2013 | Yuan et al. .................. | 369/13.33 |
| 8,638,645 B1 * | 1/2014 | Nishijima et al. .......... | 369/13.33 |
| 8,773,956 B1 | 7/2014 | Wang | |
| 8,787,129 B1 | 7/2014 | Jin | |
| 8,790,527 B1 | 7/2014 | Luo | |
| 8,830,800 B1 | 9/2014 | Pitcher | |
| 8,934,198 B2 | 1/2015 | Zou | |
| 8,945,731 B2 | 2/2015 | Zhao | |
| 8,971,161 B2 | 3/2015 | Cheng | |

(Continued)

FOREIGN PATENT DOCUMENTS

| | | |
|---|---|---|
| EP | 0580368 | 1/1994 |
| JP | 2007-073702 | 3/2007 |

(Continued)

OTHER PUBLICATIONS

Sato et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.

(Continued)

*Primary Examiner* — Angel Castro
(74) *Attorney, Agent, or Firm* — Mueting, Raasch & Gebhardt, P.A.

(57) ABSTRACT

A device that includes a near field transducer (NFT); at least one cladding layer adjacent the NFT; and a carbon interlayer positioned between the NFT and the at least one cladding layer.

20 Claims, 7 Drawing Sheets

(56) References Cited

U.S. PATENT DOCUMENTS

| | | | |
|---|---|---|---|
| 8,988,827 B1* | 3/2015 | Balamane et al. | 360/125.31 |
| 9,036,307 B1* | 5/2015 | Hoshiya et al. | 360/313 |
| 2010/0002330 A1* | 1/2010 | Lille | 360/59 |
| 2010/0104768 A1 | 4/2010 | Xiao | |
| 2010/0123965 A1 | 5/2010 | Lee | |
| 2010/0321814 A1 | 12/2010 | Zou | |
| 2010/0329085 A1 | 12/2010 | Kawamori | |
| 2011/0096431 A1 | 4/2011 | Hellwig | |
| 2011/0205863 A1 | 8/2011 | Zhao | |
| 2012/0045662 A1 | 2/2012 | Zhao | |
| 2012/0105996 A1 | 5/2012 | Katine | |
| 2012/0140609 A1 | 6/2012 | Huang | |
| 2013/0235707 A1 | 9/2013 | Zhao | |
| 2013/0279315 A1 | 10/2013 | Zhao | |
| 2013/0288077 A1 | 10/2013 | Dhawan | |
| 2013/0330573 A1 | 12/2013 | Zhao | |
| 2014/0004384 A1 | 1/2014 | Zhao | |
| 2014/0241139 A1* | 8/2014 | Nishijima et al. | 369/13.33 |
| 2014/0251948 A1 | 9/2014 | Zhao | |
| 2014/0307534 A1 | 10/2014 | Zhou | |
| 2014/0313872 A1* | 10/2014 | Rawat et al. | 369/13.33 |
| 2014/0376349 A1 | 12/2014 | Cheng | |
| 2014/0376350 A1* | 12/2014 | Cheng et al. | 369/13.33 |
| 2015/0117170 A1* | 4/2015 | Zhao et al. | 369/13.33 |
| 2015/0124575 A1* | 5/2015 | Sasaki et al. | 369/13.33 |
| 2015/0146508 A1 | 5/2015 | Zhao | |
| 2015/0170684 A1 | 6/2015 | Cheng | |
| 2015/0179197 A1* | 6/2015 | Clinton et al. | 369/13.33 |
| 2015/0179199 A1* | 6/2015 | Peng et al. | 369/13.33 |
| 2015/0255096 A1* | 9/2015 | Sasaki et al. | 360/125.31 |

FOREIGN PATENT DOCUMENTS

| | | |
|---|---|---|
| JP | 2007-242788 | 9/2007 |
| JP | 2009-016869 | 1/2009 |
| JP | 2011-008899 | 1/2011 |
| JP | 2013-122811 | 6/2013 |
| WO | WO 2013/163195 | 10/2013 |
| WO | WO 2013/163470 | 10/2013 |

OTHER PUBLICATIONS

Vogt, K.W. et al., "Characterization of Thin Titanium Oxide Adhesion Layers on Gold Resistivity, Morphology, and Composition", *Surface Science,* North-Holland, Amsterdam, NL, vol. 301, No. 1-3, Jan. 10, 1994, pp. 203-213.

Metallization: "Metallization"; chapter 5 , In: *Kris v. Srikrishnan and Geraldine C. Schwartz:* "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.

\* cited by examiner

DEVICES INCLUDING A NEAR FIELD TRANSDUCER (NFT), AT LEAST ONE CLADDING LAYER AND INTERLAYER THERE BETWEEN

BACKGROUND

Heat assisted magnetic recording (referred to herein as "HAMR") technology is a promising approach for increasing storage density beyond 1 Tbit/inch$^2$. HAMR heads can utilize near field transducers (NFTs) to heat the magnetic recording layers. Poor adhesion between the materials of the NFT and the surrounding structures in the HAMR head can lead to failure during processing or use. Therefore, there remains a need to decrease such failure.

SUMMARY

Disclosed are devices that include a near field transducer (NFT); at least one cladding layer adjacent the NFT; and a carbon interlayer positioned between the NFT and the at least one cladding layer.

Also disclosed are devices that include an energy source; a near field transducer (NFT) configured to receive energy from the energy source; at least one cladding layer adjacent the NFT; and a carbon interlayer positioned between the NFT and the at least one cladding layer.

Further disclosed are devices that include a near field transducer (NFT); a write pole; a waveguide; a NPS cladding layer positioned between the NFT and the pole; a CNS cladding layer positioned between the waveguide and the NFT; and at least one carbon interlayer comprising amorphous carbon and positioned between the NPS and the NFT, the CNS and the NFT, or both.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
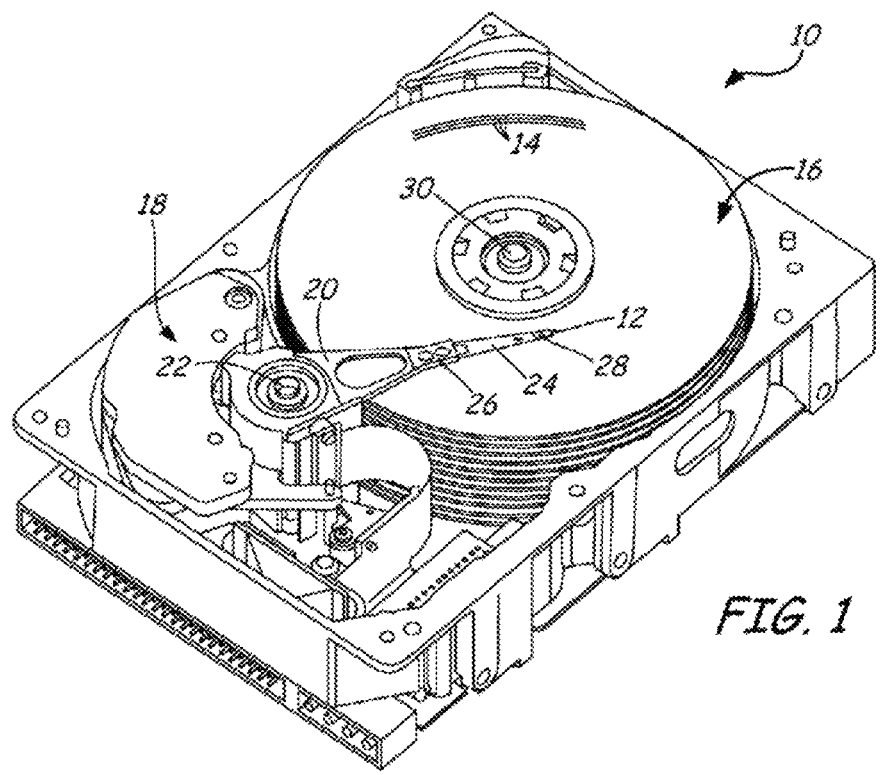
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
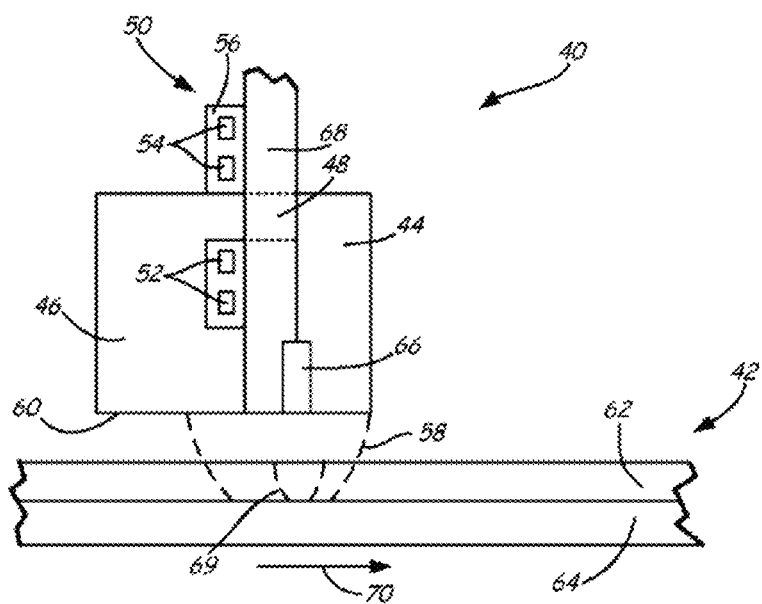
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium.

Magnetic devices disclosed herein can also include other structures. Magnetic devices disclosed herein can also be incorporated into larger devices. For example, sliders can include magnetic devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example.

Figure 3:
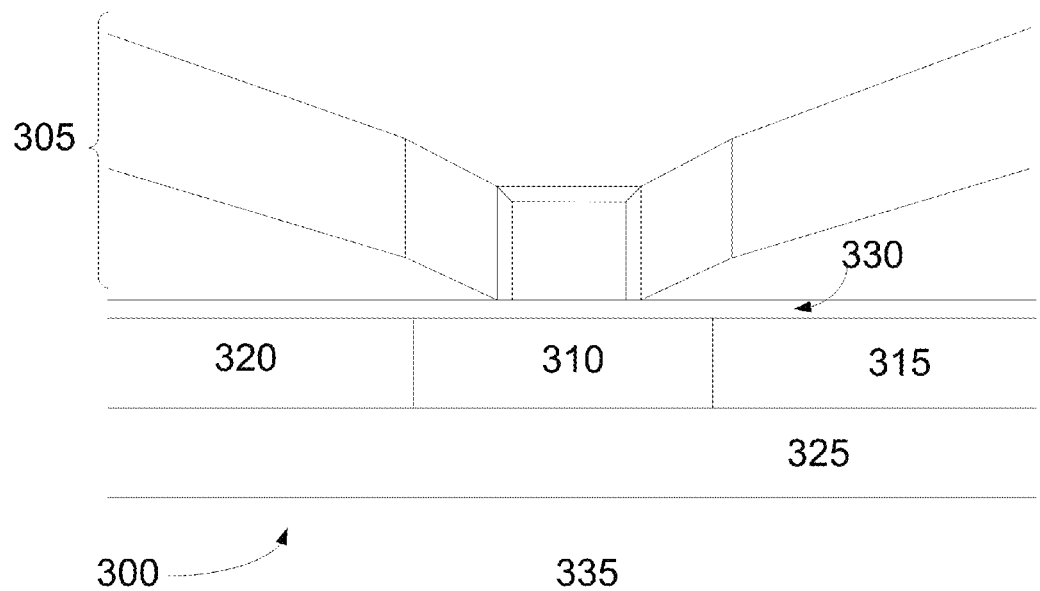
FIG. 3 is a perspective view of a portion of a magnetic device including a carbon interlayer.

FIG. 3 depicts a partial perspective view of a portion of a magnetic device. The magnetic device 300 can include a write pole 305 (which may have characteristics as discussed above) and a near field transducer (NFT) 310. The NFT 310 depicted in FIG. 3 can be any type or structure of NFT (for example plasmonic gap type NFTs or peg and disc type NFTs, which can also be referred to as "lollipop" type NFTs). Typically, the NFT 310 can be made of materials, such as for example gold (Au), gold (Au) doped with another material (for example, AuGe), silver (Ag), silver (Ag) doped with another material (for example, AgGe), copper (Cu), and aluminum (Al). In some embodiments, the NFT 310 can also be made of materials listed in U.S. Patent Publication 2011/0205863 entitled "HAMR NFT Materials with Improved Thermal Stability," filed Feb. 23, 2011, the disclosure of which is incorporated herein by reference thereto.

A disclosed magnetic device also includes at least one cladding layer. The exemplary magnetic device 300 includes front cladding 315 and 320, bottom cladding 325, and top cladding 330. Generally, a NFT 310 is entirely surrounded by cladding materials. The at least one cladding layer (and in this embodiment, the illustrative front cladding 315 and 320, the bottom cladding 325, and the top cladding 330) can generally be formed from dielectric materials having low (relative to the material of the NFT) index of refractions. Exemplary materials include $Y_2O_3$, $Ta_2O_5$, $Al_2O_3$, $SiO_2$, MgO, MgF2, $Si_3N_4$, SiON, and $TaSiO_x$. Materials disclosed in United States Patent Publication No. 2011/0205864, entitled "Optical Waveguide Clad Material", filed Feb. 23, 2011, the disclosure of which is incorporated herein by reference thereto, can also be utilized for the front cladding 315 and 320, the bottom cladding 325, the top cladding 330, or some combination thereof. In embodiments, the cladding layers are made of $Al_2O_3$ or $SiO_2$ for example.

It can often be difficult to get the NFT, which can be gold, for example, to adhere well to the surrounding cladding layers. It will be noted that the following discussion refers to a gold (Au) NFT, but all considerations are equally applicable with other plasmonic materials. Two of the reasons Au possesses poor mechanical robustness and thermal stability are its inherently low hardness and high grain boundary mobility (i.e. grains that are easily coarsened and plastically reflowed). One proposed method to improve the mechanical robustness of Au is through doping. Through the addition of another element into the Au NFT, the grains can be refined and the boundaries can be stabilized by lowering the grain boundary energy and/or by solute pinning of the grain boundaries. These alloying additions, however, will nominally degrade the thermal conductivity and the optical properties, compared to that of pure Au.

Another attributing failure mechanism is the characteristics of the Au/oxide interface. In current HAMR NFT designs, the Au NFT is surrounded by oxide cladding materials (e.g. $SiO_2$ or $Al_2O_3$) for core-NFT spacer (CNS) and NFT-pole spacer (NPS), as discussed above. An Au/oxide interface is known to be weak based on surface energies and boundary coherency. While Au has a higher surface energy (1.5 $J/m^2$), the typical optical cladding oxides used in HAMR have much lower values (e.g. 0.2 J/m for $SiO_2$ and 0.9 J/m for $Al_2O_3$). Such a low surface energy, as well as a high interfacial energy between Au and oxide, makes it energetically favorable for Au to detach from the surrounding oxides, which could lead to interfacial diffusion and peg deformation. It is thought, but not relied upon, that this may be the mechanism by which the Au atoms from within the NFL peg are able to diffuse back into the disk, causing recession.

Disclosed devices include a relatively thin, non-metal layer between the metal of the peg and the surrounding dielectric material. It is thought, but not relied upon that this thin non-metal layer could increase the work required to create a free surface at the NFT/dielectric interface by increasing the associated adhesion. In some embodiments, the relatively thin, non-metal layer includes carbon, in some embodiments amorphous carbon.

Figure 4:
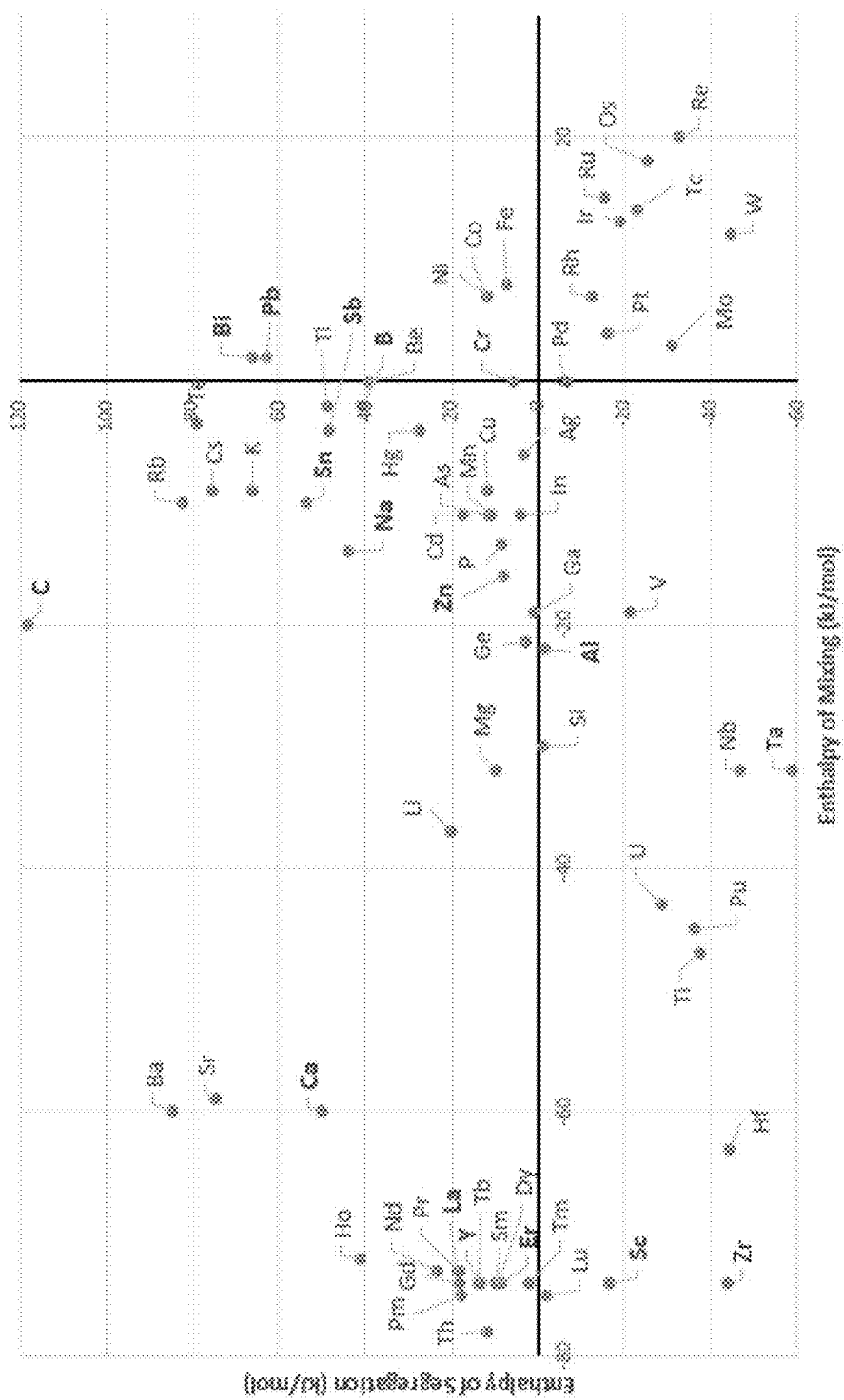
FIG. 4 is a graph showing the enthalpy of mixing versus enthalpy of segregation of dilute-limit alloying in gold (Au), based on thermodynamic calculations.

It is thought that carbon's thermodynamic properties when mixed with gold may be beneficial to the system. Based on thermodynamic calculations, carbon possesses the highest enthalpy of segregation of any element in gold, and it has a small magnitude, negative enthalpy of mixing, as shown in the graph in FIG. 4. Because of these properties, carbon between the NFT and dielectric should remain in the surface/near sub-surface region of the NFT metal.

Figure 5:
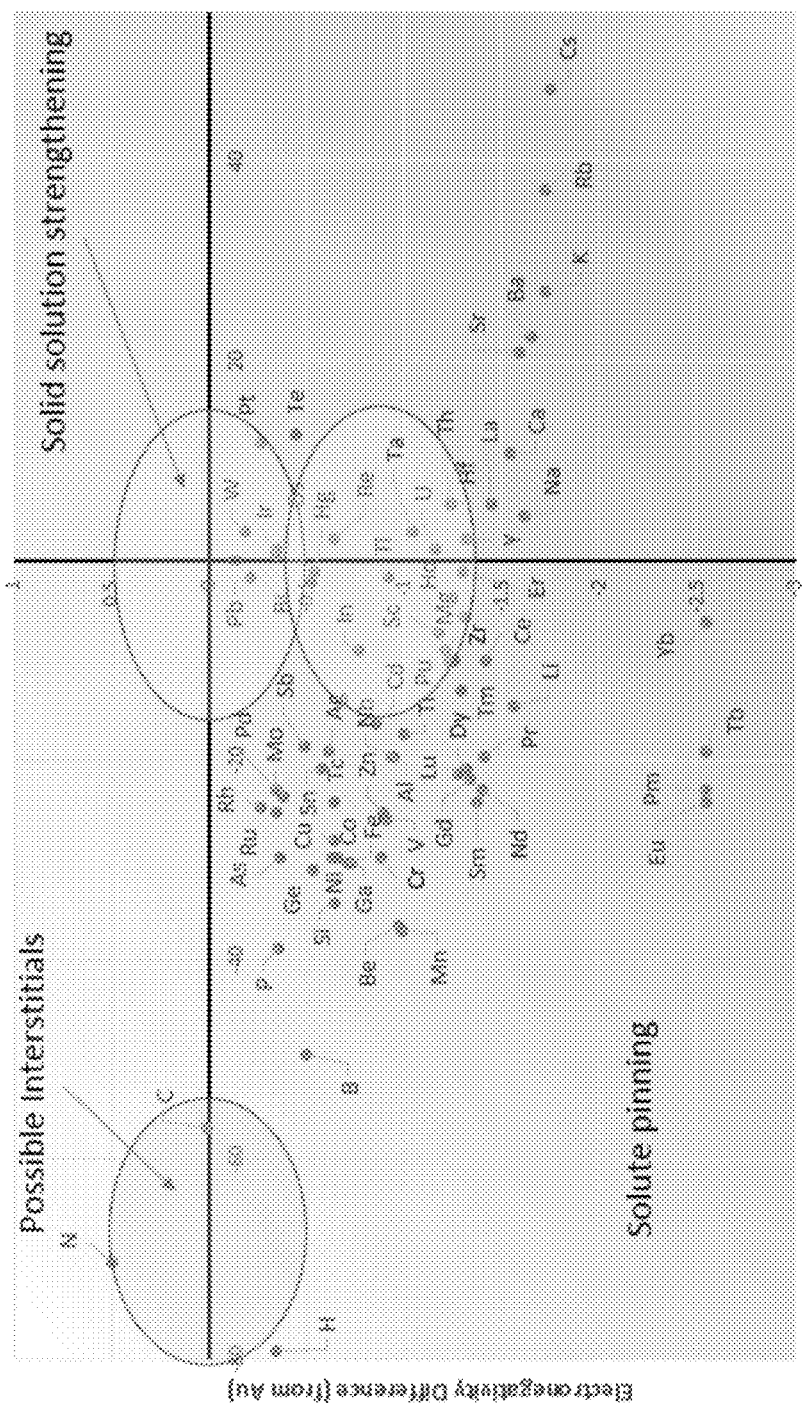
FIG. 5 is a graph (based on thermodynamic calculations) showing the Enthalpy of Mixing vs the Enthalpy of Segregation of dilute-limit alloying in Au.

Furthermore, as seen in FIG. 5, from plotting the atomic size difference (compared to Au, for example) and the electronegativity difference (compared to Au, for example) according to the Darken-Gurry method, carbon is one of two elements that could possibly be an interstitial within an Au lattice structure.

This favorable combination of atomic size and electronegativity differences may allow the surface and the near sub-surface region of the Au to be densified by the addition of C atoms. Therefore, in some embodiments, disclosed interlayers can include carbon, for example amorphous carbon. Amorphous carbon may be useful in interlayers because it can be considered somewhat reactive. Amorphous carbon, as opposed to crystalline carbon (which is also referred to as diamond like carbon (DLC)) has some carbons that are not bonded to neighboring carbons. These non-bonded carbons are therefore somewhat reactive and thus have a higher diffusivity, which may allow it to be incorporated into the lattice of the NFT material (e.g., gold).

Disclosed interlayers can be included adjacent to one or more of the surfaces of a NFT. A disclosed interlayer can generally be located between a surface of an NFT and an adjacent surrounding cladding layer. Regardless of the position of the interlayer(s), it (or they) can be described by its average thickness. In embodiments, disclosed interlayers can have an average thickness of not less than 0.5 nm, not less than 1 nm, or in some embodiments not less than 2 nm. In embodiments, disclosed interlayers can have an average thickness of not greater than 20 nm, not greater than 15 nm, in some embodiments not greater than 12 nm, or in some embodiments not greater than 5 nm. In some embodiments, a disclosed interlayer can have a thickness between 0.5 nm and 2.5 nm.

The average thickness of an interlayer (or another layer) can be measured by transmission electron microscopy (TEM), or x-ray photoelectron spectroscopy (XPS) for example. The thickness can be determined using calibration from standard samples having known thicknesses.

In embodiments, an interlayer can be positioned between each surface of the NFT and each surrounding cladding layer; and in embodiments, an interlayer can be positioned between less than each surface of the NFT and the surrounding cladding layers. In embodiments, an interlayer can be positioned between surfaces of the NFT that are in contact with the front cladding layers 315 and 320, the bottom cladding layer 325, the top cladding layer 330, or some combination thereof, as seen in FIG. 3. In some embodiments, an interlayer can be in contact with substantially of the front cladding layers 315 and 320, and substantially all of the bottom cladding layer 325. In some embodiments, deposition processes could be controlled so that the interlayer preferentially contacts some or all of the surfaces of the various cladding layers.

FIGS. 6A to 6E provide illustrative embodiments of devices that include disclosed interlayers.

Figure 6A:
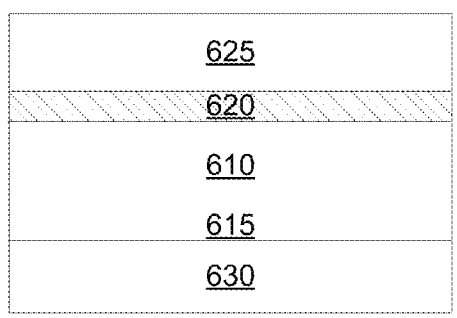
FIGS. 6A to 6E are cross sections (FIGS. 6A, 6B and 6C) showing illustrative devices including carbon interlayers and perspective views showing rods of NFTs (FIGS. 6D and 6E) and a peg and disc type NFT (FIG. 6F).

FIG. 6A shows a disclosed device depicted in a layer format. Such a device can include a bottom cladding or a core to NFT space (CNS) 630, an optional seed layer 615 disposed thereon, a NFT 610, a top cladding or a NFT to pole space (NPS) 625 and a carbon interlayer 620 disposed between the NPS 625 and the NFT 610. In such an embodiment, the carbon interlayer 620 can be deposited after formation of the NFT 610 and before deposition of the NPS 625. In some illustrative embodiments, the carbon interlayer 620 can be annealed to influence interdiffusion of the carbon into the near sub-surface of the NFT metal. This optional step can be described as forming an inter diffused metal-carbon layer which was formed from some top portion of the NFT and some bottom (or all) portion of the deposited carbon interlayer. The optional anneal step can be undertaken before, after, or both the NPS 625 is deposited. In some embodiments that include an annealing of the amorphous carbon before NPS deposition, an optional step of removing carbon not inter-diffused into the NFT can also be undertaken. The removal step can be done, for example, by ashing, e.g., oxygen ($O_2$) ashing.

In some embodiments where a portion of the carbon not interdiffused into the NFT metal (e.g., leaving at least some material that can be described as an interdiffused metal-carbon interlay) is removed, an interdiffused metal-carbon interlayer or an interdiffused interlayer that exists between the NFT and a cladding layer can be described by an average thickness thereof. Disclosed interdiffused interlayers can have an average thickness of not less than 5 nm, not less than 3 nm, or in some embodiments not less 1 nm. In embodiments, disclosed interdiffused interlayers can have an average thickness of not greater than 10 nm, not greater than 5 nm, or in some embodiments not greater than 3 nm. In some embodiments, a layer of material can be deposited, and then some of that material can be interdiffused into the NFT metal. Once some of the material has been interdiffused, the thickness of the layer can actually decrease (even if some of the material is not removed after interdiffusion). In some embodiments, a layer of material (e.g., amorphous carbon) not greater than 10 nm (in some embodiments from 5 nm to 10 nm for example) can be deposited and then at least some of the material can be interdiffused in the NFT material. After interfusion, the layer may be thinner than originally deposited and optionally some of the material originally deposited can be removed.

Figure 6B:
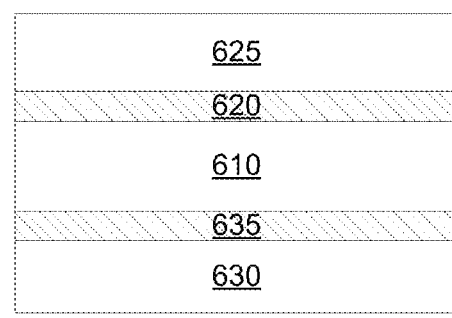

FIG. 6B shows a disclosed device, also depicted in a layer format, that includes a CNS 630, a NFT 610, and a NPS 625. This illustrative device includes a first carbon interlayer 620 between the NFT 610 and the NPS 625 and a second carbon interlayer 635 between the NFT 610 and the CNS 630. The first carbon interlayer and the second carbon interlayer can, but need not be the same. Either or both of them may optionally be annealed to influence diffusion of some of the carbon into the near sub-surfaces of the NFT metal. Similarly, either or both of them may have some portion of the carbon not interdiffused, optionally removed via a step, such as ashing (e.g., $O_2$ ashing).

Figure 6C:
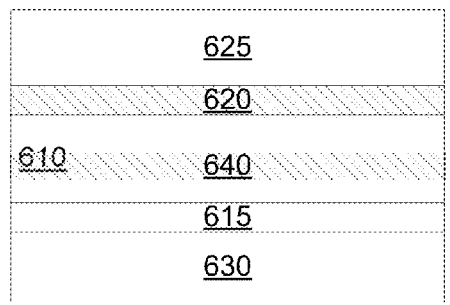

FIG. 6C shows a disclosed device, also depicted in layer format that includes a CNS 630, a NFT 610, and a NPS 625. This illustrative device includes a first carbon interlayer 620 between the NFT 610 and the NPS 625 and a mid carbon interlayer 640 that can be described as being within the NFT 610, or similarly described as being surrounded by NFT material. Such a device may include a second carbon interlayer positioned between the NFT 610 and the CNS 630 or a seed layer (as was seen in FIG. 6A). Either or both of them (as well as the optional second carbon interlayer) may optionally be annealed to influence diffusion of some of the carbon into the near sub-surfaces of the NFT metal. Similarly, either or both of them may have some portion of the carbon not interdiffused, optionally removed via a step, such as ashing (e.g., $O_2$ ashing). In some embodiments, the mid carbon interlayer 640 can be deposited after some portion of the NFT 610 has been deposited, annealed to influence inter-diffusion into the near sub-surface of the NFT metal layer, then optionally some portion of the deposited mid carbon layer material can be removed (e.g., via $O_2$ ashing) and then additional NFT material can be deposited. It is thought, but not relied upon that a mid carbon interlayer may provide a carbon source within the NFT material itself. This carbon source, upon anneal may increase the depth of carbon penetration into the NFT material. Such an optional mid layer may afford a smoother carbon gradient into the NFT material, which may allow the surface energy to be displaced across a larger distance.

Figure 6D:
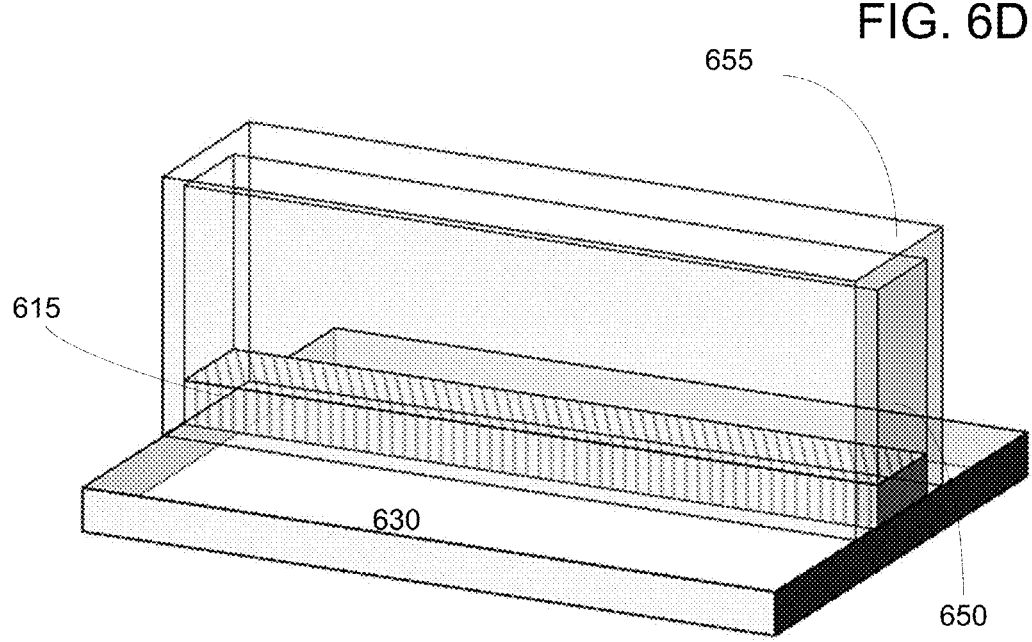

FIG. 6D depicts a perspective view of a rod 650 of a NFT that has been formed on a seed layer 615 on a CNS 630. Covering three surfaces, in this case, of the rod 650 is a carbon interlayer 655. The carbon interlayer 655 can have properties (e.g., thicknesses, annealed or not, partially removed or not, etc.) such as those described above. The three surfaces of the rod 650 that are covered can be described as the top and sides of the rod. Such a carbon interlayer can be deposited after deposition and formation of the rod.

Figure 6E:
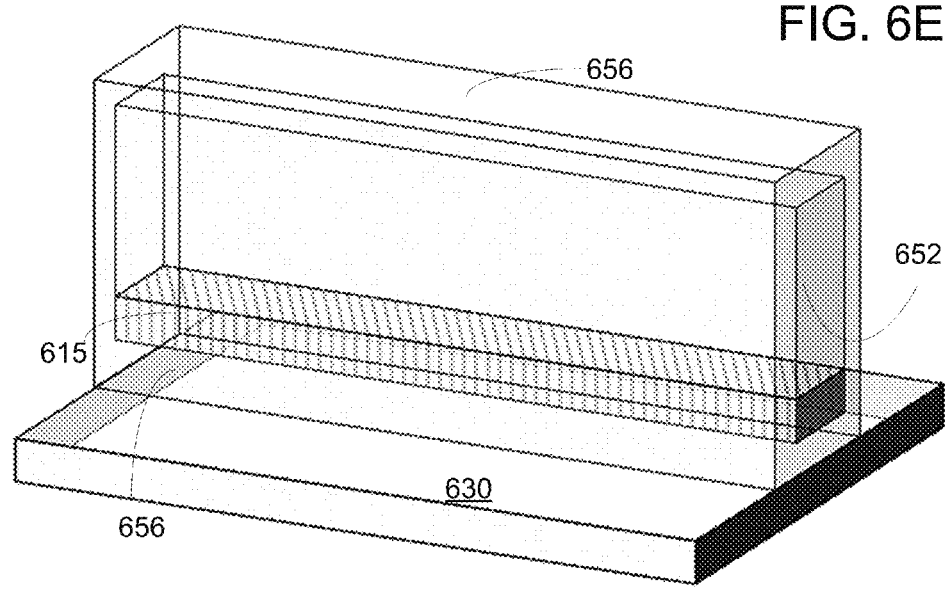

FIG. 6E depicts a perspective view of a rod 652 of a NFT that has been formed on a seed layer 615 on a CNS 630. Covering four surfaces, in this case of the rod 652 is a carbon interlayer 656. The carbon interlayer 656 can have properties (e.g., thicknesses, annealed or not, partially removed or not, etc.) such as those described above. The four surfaces of the rod 652 that are covered can be described as the bottom, top and sides of the rod. Such a carbon interlayer can be deposited before deposition of the NFT material and after formation of the rod.

Figure 6F:
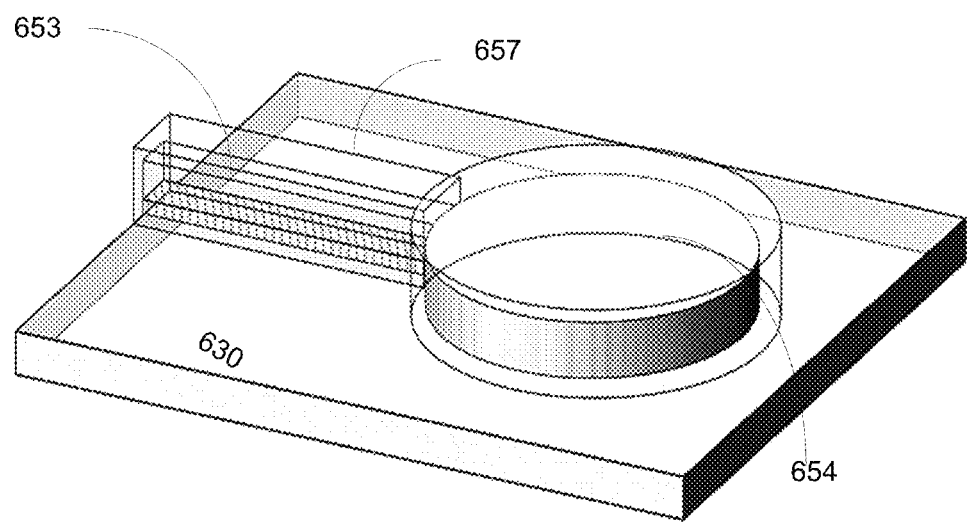

FIG. 6F depicts a perspective view of a lollipop NFT (e.g., a NTL) that has been formed on a seed layer 615 on a CNS 630. The NFT in this embodiment includes a disc 654 and a peg 653. Covering all sides and tops of the disc 654 and the peg 653 is the carbon interlayer 657. This particularly depicted carbon interlayer 657 only covers all side surfaces and top surfaces of the peg and disc, but it should be understood that a carbon interlayer could also have been formed under the peg, the disc or both before they were formed. The carbon interlayer 657 can have properties (e.g., thicknesses, annealed or not, partially removed or not, etc.) such as those described above. The surfaces of the peg 653 and the disc 654 that are covered can be described as the top and sides. Such a carbon interlayer can be deposited before deposition of the NFT material and after deposition and formation of the rod but before deposition of the NPS material which would cover all surfaces of the peg 653 and the disc 654 (or the entire carbon interlay 657).

Disclosed carbon interlayers can include carbon, for example amorphous carbon. Disclosed carbon interlayers can be deposited using known methods including, for example, physical vapor deposition (PVD) methods (e.g., sputtering, ion beam deposition (IBD), etc.), chemical vapor deposition (CVD) methods, other deposition methods, or any combinations thereof. Creation of carbon interlayers and optional processing (e.g., annealing, removal, etc.) can also be incorporated into known processes or methods of producing devices such as devices including NFTs.

EXAMPLES

While the present disclosure is not so limited, an appreciation of various aspects of the disclosure will be gained through a discussion of the examples provided below.

Figure 7A:
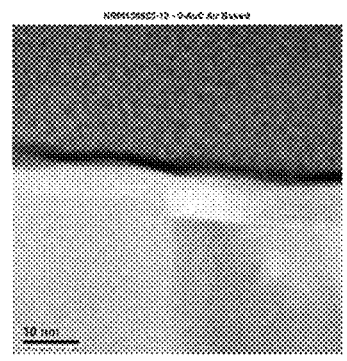
FIGS. 7A, 7B, and 7C show transmission electron microscopy (TEM) High-Angle Annular Dark Field image of Au after C surface treatment (FIG. 7A), secondary ion mass spectroscopy (SIMS) data from AuCo alloys showing Zr migration (FIG. 7B), and SIMS data showing the Zr seed stabilization by C surface treatment (FIG. 7C).
Figure 7B:
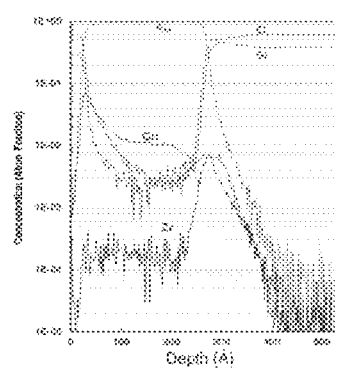
Figure 7C:
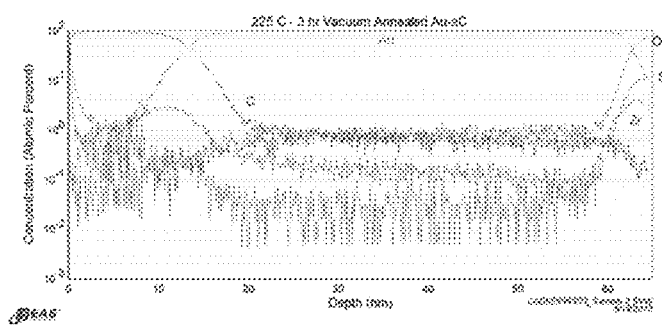

In the initial studies done at sheet film level, a change in the columnar microstructure was observed within the top ~2 nm of the Au films when C was deposited on the surface and annealed, as shown in FIG. 7A. This increased density and change in microstructure also proved, by secondary ion mass spectrometry (SIMS) analysis, to keep the Zr seed layer in place. Seed layer stability has been an issue in many Au-based alloys, as shown in FIG. 7B leading to grain structure instability in other NFT material systems. The Au-aC system provided added stability for the Zr seed, presented in FIG. 7C. Since the C layer had this effect on the Zr seed layer, it is believed that it would have a similar effect in stabilizing the equilibrium position of alloying elements present in the peg material.

In addition, in sheet film studies, it was found that the Au/Al$_2$O$_3$ interface failed adhesion tests 10 out of 25 times after annealing. When a C layer was present at this interface, the system failed the adhesion test 0 out of 25 times. The table of these results is presented in Table 1 below. It is believed that the C in the experimentally studied Au/Al$_2$O$_3$ system acted to increase the work energy needed to separate these surfaces.

TABLE 1

| Sample | | Average Thickness (nm) | Adhesion Test Results (Passed/Total) | | |
|---|---|---|---|---|---|
| | | | As Dep. | 400° C./ 3 hrs | 500° C./ 3 hrs |
| Control | Y$_2$O$_3$/Au/Y$_2$O$_3$ | 25.8 | | 23/25 | 21/25 |
| 1 | Y$_2$O$_3$/Au + 2.5 nm aC/Y$_2$O$_3$ | 26.66 | 25/25 | 25/25 | 23/25 |
| 2 | Y$_2$O$_3$/Au + 10 nm aC/Y$_2$O$_3$ | 26.96 | 25/25 | 25/25 | 21/25 |
| Control | Al$_2$O$_3$/Au/Al$_2$O$_3$ | 25.8 | | 21/25 | 15/25 |
| 1 | Al$_2$O$_3$/Au + 2.5 nm aC/Al$_2$O$_3$ | 27.32 | 25/25 | 25/25 | 25/25 |

TABLE 1-continued

| Sample | | Average Thickness (nm) | Adhesion Test Results (Passed/Total) | | |
|---|---|---|---|---|---|
| | | | As Dep. | 400° C./ 3 hrs | 500° C./ 3 hrs |
| 2 | Al$_2$O$_3$/Au + 10 nm aC/Al$_2$O$_3$ | 26.06 | 25/25 | 25/25 | 24/25 |
| Control | Al$_2$O$_3$/AuCo/Al$_2$O$_3$ | 50 | | 25/25 | 14/25 |
| 1 | Al$_2$O$_3$/AuCo + 10 nm aC/Al$_2$O$_3$ | 27.84 | 25/25 | 25/25 | 23/25 |
| 2 | Al$_2$O$_3$/AuCo + 2.5 nm aC/Al$_2$O$_3$ | 27.7 | 25/25 | 25/25 | 21/25 |

Finally, the optical constants measured through ellipsometry have shown that the optic penalty associated with the C surface treatment is less than that of other alloying and adhesion methods that have been claimed and attempted. This low optic penalty will translate to a lower NFT temperature rise associated with using this material system. There are a few embodiments depicted below that would allow for effective application of such a C layer into an NFT material system.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices including a near field transducer (NFT), at least one cladding layer and interlayer there between are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
   a near field transducer (NFT);
   at least one cladding layer adjacent the NFT; and
   a carbon interlayer positioned between the NFT and the at least one cladding layer.

2. The device according to claim 1, wherein the NFT comprises gold (Au), gold (Au) doped with another material, silver (Ag), silver (Ag) doped with another material, copper (Cu), or aluminum (Al).

3. The device according to claim 1, wherein the NFT comprises gold.

4. The device according to claim 1, wherein the at least one cladding layer comprises $Y_2O_3$, $Ta_2O_5$, $Al_2O_3$, $SiO_2$, MgO, MgF2, $Si_3N_4$, SiON, $TaSiO_x$, or combinations thereof.

5. The device according to claim 1, wherein the carbon interlayer comprises amorphous carbon.

6. The device according to claim 1, wherein the carbon interlayer has a thickness from about 2 nm to about 15 nm.

7. The device according to claim 1, wherein the carbon interlayer is positioned on at least the sides and top of the NFT.

8. The device according to claim 1, wherein the carbon interlayer is positioned on at least the sides, top and bottom of the NFT.

9. The device according to claim 1, wherein the carbon interlayer comprises at least some metal from the NFT.

10. The device according to claim 9, wherein the metal from the NFT diffused into the amorphous carbon, carbon diffused into the NFT metal, or a combination thereof.

11. A device comprising:
    an energy source;
    a near field transducer (NFT) configured to receive energy from the energy source;
    at least one cladding layer adjacent the NFT; and
    a carbon interlayer positioned between the NFT and the at least one cladding layer.

12. The device according to claim 11, wherein the carbon interlayer comprises amorphous carbon.

13. The device according to claim 11, wherein the carbon interlayer has a thickness from about 2 nm to about 15 nm.

14. The device according to claim 11, wherein the carbon interlayer is positioned on at least the sides and top of the NFT.

15. The device according to claim 11, wherein the carbon interlayer is positioned on at least the sides, top and bottom of the NFT.

16. The device according to claim 11, wherein the carbon interlayer comprises at least some metal from the NFT.

17. The device according to claim 16, wherein the metal from the NFT diffused into the amorphous carbon, carbon diffused into the NFT metal, or a combination thereof.

18. The device according to claim 11 further comprising a waveguide, the waveguide configured to receive the energy from the energy source and couple it into the NFT.

19. A device comprising:
    a near field transducer (NFT);
    a write pole;
    a waveguide;
    a NFT-pole spacer (NPS) cladding layer positioned between the NFT and the pole;
    a core-NFT spacer (CNS) cladding layer positioned between the waveguide and the NFT; and
    at least one carbon interlayer comprising amorphous carbon and positioned between the NPS and the NFT, the CNS and the NFT, or both.

20. The device according to claim 19, wherein the at least one carbon interlayer is positioned between the NPS and the NFT and the CNS and the NFT.

* * * * *